(12) United States Patent
McDaniel

(10) Patent No.: US 11,859,740 B2
(45) Date of Patent: Jan. 2, 2024

(54) FLANGE JOINT ASSEMBLY FOR FLAMMABLE LIQUID

(71) Applicant: Monsanto Technology LLC, St. Louis, MO (US)

(72) Inventor: William Mark McDaniel, Wildwood, MO (US)

(73) Assignee: Monsanto Technology LLC, St. Louis, MO (US)

( * ) Notice: Subject to any disclaimer, the term of this patent is extended or adjusted under 35 U.S.C. 154(b) by 0 days.

(21) Appl. No.: 17/482,343

(22) Filed: Sep. 22, 2021

(65) Prior Publication Data

US 2022/0010902 A1    Jan. 13, 2022

Related U.S. Application Data

(62) Division of application No. 16/469,492, filed as application No. PCT/US2017/065988 on Dec. 13, 2017.

(60) Provisional application No. 62/433,590, filed on Dec. 13, 2016.

(51) Int. Cl.
| | | |
|---|---|---|
| *F16L 23/24* | (2006.01) | |
| *F16J 15/12* | (2006.01) | |
| *F16L 51/03* | (2006.01) | |

(52) U.S. Cl.
CPC .............. *F16L 23/24* (2013.01); *F16J 15/122* (2013.01); *F16L 51/035* (2013.01)

(58) Field of Classification Search
CPC ....... F16L 23/24; F16L 51/035; F16L 23/125; F16L 58/187; F16J 15/122; F16J 15/126
See application file for complete search history.

(56) References Cited

U.S. PATENT DOCUMENTS

| | | | |
|---|---|---|---|
| 2,580,546 A | * | 1/1952 | Hobson, Jr. ............ F16J 15/104 277/946 |
| 2,998,984 A | | 9/1961 | Gressel |
| 3,151,869 A | | 10/1964 | Butcher |

(Continued)

OTHER PUBLICATIONS

"Graphite", ScienceDirect, from Activated Carbon, 2006 (Year: 2006).*

(Continued)

*Primary Examiner* — James M Hewitt, II
(74) *Attorney, Agent, or Firm* — Harness, Dickey & Pierce, P.L.C.

(57) ABSTRACT

A flanged fitting includes an annular fitting flange having an annular end face. A glass liner lines a radially inner annular portion of the annular end face of the annular fitting flange. A radially outer annular portion of the annular end face of the annular fitting flange is free from the glass liner. The radially inner annular portion and the radially outer annular portion of the annular end face of the annular fitting flange define an annular gasket abutment face configured to seat a gasket thereon. An annular gasket includes an annular gasket layer. The annular gasket layer includes a radially inner annular gasket segment including a first material suitable for forming a liquid-tight seal with an opposing flange. A radially outer annular gasket segment surrounds the radially inner annular gasket segment. The radially outer annular gasket segment is fire-rated for forming a fire-rated seal with the opposing flange.

14 Claims, 9 Drawing Sheets

(56) References Cited

U.S. PATENT DOCUMENTS

| | | | |
|---|---|---|---|
| 3,230,290 A * | 1/1966 | Nelson | F16J 15/104 |
| | | | 277/630 |
| 3,253,841 A | 3/1966 | Ahmad | |
| 3,359,626 A | 12/1967 | Auld et al. | |
| 3,559,844 A | 2/1971 | Schloberg | |
| 4,114,908 A * | 9/1978 | Nicholson | F16J 15/0881 |
| | | | 277/612 |
| 4,643,457 A | 2/1987 | Press | |
| 4,662,660 A | 5/1987 | Perea | |
| 4,691,740 A | 9/1987 | Svetlik et al. | |
| 4,795,174 A * | 1/1989 | Whitlow | F16L 49/04 |
| | | | 277/654 |
| 5,171,041 A | 12/1992 | McMillan et al. | |
| 5,573,282 A | 11/1996 | Egner et al. | |
| 5,713,524 A | 2/1998 | Greene et al. | |
| 5,944,322 A * | 8/1999 | Coff | F16J 15/127 |
| | | | 277/938 |
| 6,092,811 A * | 7/2000 | Bojarczuk | F16J 15/122 |
| | | | 277/938 |
| 6,402,159 B1 * | 6/2002 | Kohn | F16L 25/026 |
| | | | 277/611 |
| 6,543,811 B1 | 4/2003 | Campbell | |
| 11,125,364 B2 * | 9/2021 | Briggs | F16J 15/122 |
| 2002/0030326 A1 | 3/2002 | Bettencourt | |
| 2006/0037660 A1 | 2/2006 | Kinnally et al. | |
| 2011/0049878 A1 | 3/2011 | Goode | |
| 2013/0328270 A1 * | 12/2013 | Stubblefield | F16J 15/122 |
| | | | 277/314 |
| 2016/0348817 A1 * | 12/2016 | Veiga | F16J 15/065 |
| 2017/0074437 A1 * | 3/2017 | Briggs | F16J 15/122 |
| 2019/0353287 A1 | 11/2019 | McDaniel | |

OTHER PUBLICATIONS

Extended European Search Report for Application No. 17880165-0, dated Jun. 15, 2020, 8 pages, Munich, Germany.

International Search Report and Written Opinion for PCT/US17/65988, dated Apr. 19, 2018, 10 pages.

* cited by examiner

FLANGE JOINT ASSEMBLY FOR FLAMMABLE LIQUID

STATEMENT OF RELATED CASES

This application is a divisional of U.S. Ser. No. 16/469,492, filed Jun. 13, 2019, which is a 371 International application based on PCT Serial No. PCT/US2017/065988 filed Dec. 13, 2017, which is based on U.S. Provisional Ser. No. 62/333,590, filed Dec. 13, 2016, the entire contents of which are incorporated herein by reference.

FIELD OF THE DISCLOSURE

The present disclosure generally relates to a flanged fitting for a system for flammable liquids. Such flanged fittings can include, but are not limited to, equipment nozzle assemblies, piping, piping spools, valves, special fittings, covers, agitators, mechanical seals, baffles, and other flanged fittings.

BACKGROUND OF THE DISCLOSURE

The National Fire Protection Association's code NFPA 30 provides safeguards to reduce the hazards associated with the storage, handling, and use of flammable and combustible liquids. Suitable materials for flange fittings for flange joint assemblies for flammable and combustible liquids under NFPA 30 may include carbon steel, nickel alloys and reactive metals, such as titanium, zirconium, and tantalum. Conventional glass-lined flanged fittings would not meet NFPA 30 standard for flammable and combustible liquids or be able to pass the fire test specified in American Petroleum Institute API Specification 6FB, "Specification for Fire Test for End Connections."

One type of flanged fitting suitable for connection to a flanged conduit is an expansion joint fitting assembly. However, conventional expansion joint fittings may not be suitable to meet NFPA 30 standard for flammable and combustible liquids when connected to non-metal lined equipment and/or may not pass the fire test specified in American Petroleum Institute API Specification 6FB, "Specification for Fire Test for End Connections."

SUMMARY OF THE DISCLOSURE

In one non-limiting aspect, a flanged fitting for flammable liquid generally comprises an annular fitting flange having an annular end face, and a glass liner lining a radially inner annular portion of the annular end face of the annular fitting flange. A radially outer annular portion of the annular end face of the annular fitting flange is free from the glass liner. The radially inner annular portion and the radially outer annular portion of the annular end face of the annular fitting flange define an annular gasket abutment face configured to seat a gasket thereon.

In another non-limiting aspect, a flange joint assembly for conveying liquid generally comprises a flanged fitting having upstream and downstream longitudinal ends and a longitudinal axis extending between the opposite upstream and downstream longitudinal ends. The flanged fitting includes a fitting conduit extending along the longitudinal axis of the flanged fitting. The fitting conduit has an interior surface defining an opening extending through the upstream and downstream longitudinal ends of the flanged fitting. An annular fitting flange extends radially outward adjacent the downstream longitudinal end of the flanged fitting. The annular fitting flange has an annular downstream end face, and a non-metal liner lining the interior surface of the fitting conduit and a radially inner annular portion of the annular downstream end face of the annular fitting flange. A radially outer annular portion of the annular downstream end face of the annular fitting flange is free from the non-metal liner and is fire-rated. The non-metal lined radially inner annular portion and the radially outer annular portion of the annular downstream end face of the annular fitting flange define an annular gasket abutment face at the downstream longitudinal end of the flanged fitting. An annular gasket includes an upstream annular gasket layer generally opposing and seated on the annular gasket abutment face. The upstream layer includes a radially inner annular gasket segment and a radially outer annular gasket segment surrounding the radially inner annular gasket segment. The radially inner annular gasket segment comprises a first material suitable for forming a liquid-tight seal with the non-metal lined radially inner annular portion of the annular gasket abutment face. The radially outer annular gasket segment is fire-rated and comprises a second material suitable for forming a fire-rated seal with the radially outer annular portion of the annular gasket abutment face that is fire-rated.

In yet another aspect, an annular gasket for a flange joint assembly generally comprises an annular gasket layer. The annular gasket layer includes a radially inner annular gasket segment comprising a first material suitable for forming a liquid-tight seal with an opposing flange. The radially inner annular gasket is not fire-rated. A radially outer annular gasket segment surrounds the radially inner annular gasket segment. The radially outer annular gasket segment is fire-rated for forming a fire-rated seal with the opposing flange.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE DISCLOSURE

Figure 1:
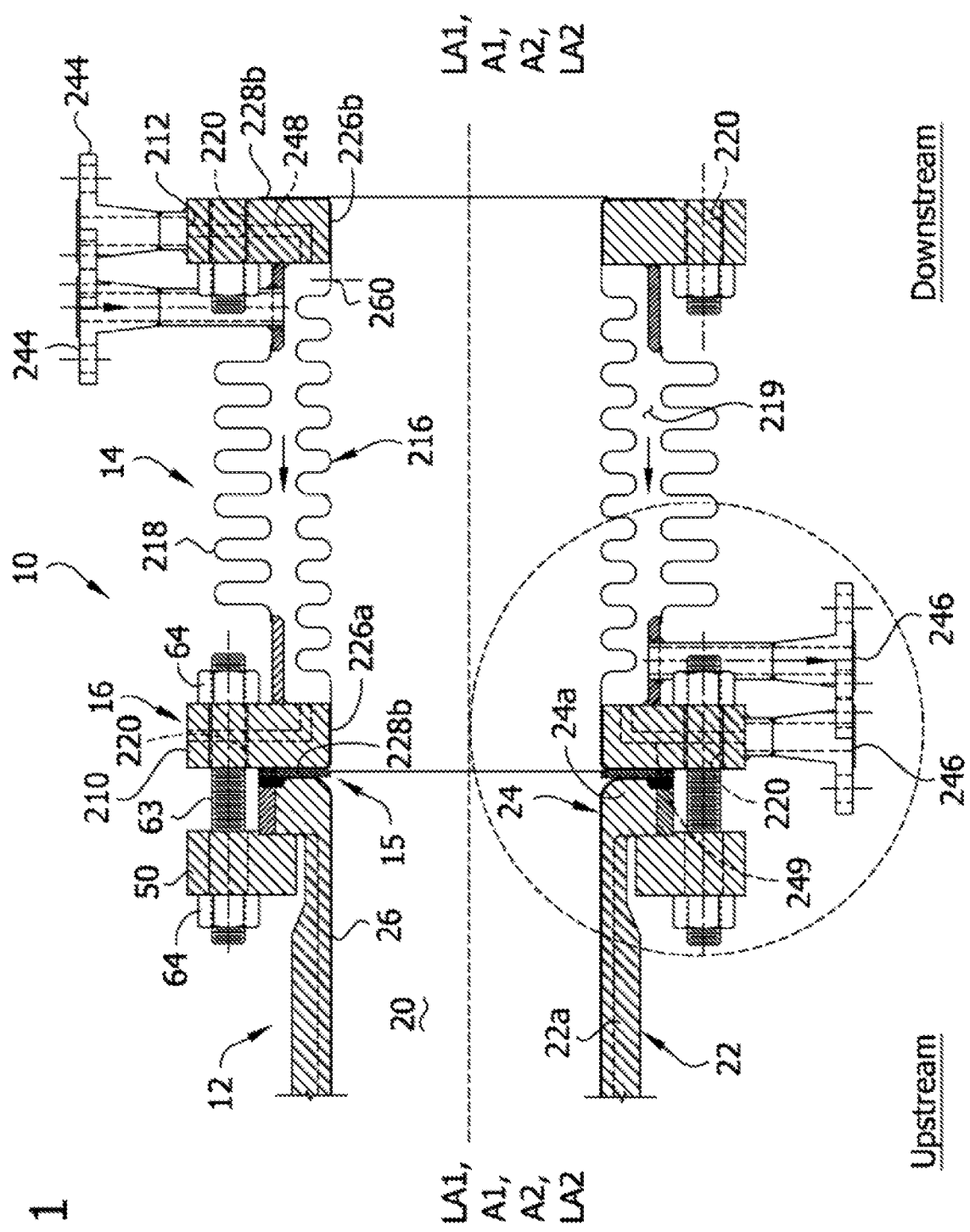
FIG. 1 is a longitudinal section of one embodiment of a flange joint assembly constructed according to the teachings of the present disclosure.

Referring to FIG. 1 of the drawings, a flange joint assembly suitable for use in conveying flammable liquid, such as from a liquid-reactor and/or within liquid-conveying conduit system is generally indicated at reference numeral 10. In this illustrated embodiment, the flange joint assembly 10 comprises a flanged fitting, generally indicated at 12; an expansion joint fitting, generally indicated at 14; an annular gasket, generally indicated at 15, disposed and sandwiched between the flanged fitting and the expansion joint fitting; and a flange coupler assembly, generally indicated at 16, coupling together the flanged fitting, the expansion joint fitting and the annular gasket. It is understood that flanged fitting 12 of the present disclosure may be used separate from and independent of the illustrated expansion joint fitting 14 and/or the illustrated annular gasket 15; the expansion joint fitting 14 may be used separate from and independent of the illustrated flanged fitting 12 and/or the illustrated annular gasket 15; and the annular gasket 15 may be used separate and independent of the illustrated flanged fitting 12 and/or the illustrated expansion joint fitting 14. For example, as explained in more detail below, the flanged fitting 12 may be coupled to other types of conduits, other than the illustrated expansion joint fitting 14, including other types of expansion joint fittings, flanged piping, flanged components, etc. (as represented schematically in FIG. 3). The expansion joint fitting 14 may be coupled to other types of flanged fittings, other than the illustrated flanged fitting 12, including other types of nozzles, or piping, etc. The annular gasket 15 may be coupled between other types of fittings, or piping, etc., other than the illustrated flanged fitting 12 and expansion joint fitting 14.

The flanged fitting 12 has a longitudinal axis LA1, opposite upstream and downstream longitudinal ends (broadly, first and second longitudinal ends), and a passage 20 extending longitudinally within the flanged fitting and through the upstream and downstream longitudinal ends thereof. As used herein when describing the flanged fitting 12 and its components and structures, the longitudinal axis of the flanged fitting is used as the point of reference for the terms "axially," "radially," "inner," "outer," and like qualifiers. The illustrated flanged fitting 12 is configured as a nozzle, such as a nozzle for a reactor vessel. In other examples, the flanged fitting 12 may comprise other types of fittings, including piping or other conduits for conveying liquids, or other types of fitting components, including covers, agitators, mechanical seals, baffles, valves, etc. for use in a liquid system.

The flanged fitting 12 comprises a conduit, generally indicated at 22, and an annular flange, generally indicated at 24, at a downstream longitudinal end of the flanged fitting. The conduit 22 comprises a conduit body 22*a* (e.g., nozzle neck; pipe), and the annular flange 24 comprises an annular flange body 24*a* at a downstream longitudinal end of the conduit body. Together, the conduit body 22*a* and the annular flange body 24*a* form a fitting body of the flanged fitting 12. The fitting body may be formed as a one-piece, monolithically formed component, or the conduit body 22*a* and the annular flange body 24*a* may be formed separately and secured to one another. The fitting body may be fire-rated. As used herein, "fire-rated" means a component or structure is formed from material that meets the standard set forth in NFPA 30, and may include carbon steel, nickel alloys, reactive metals, and combinations. The fitting body may be comprised of (e.g., be formed from) a metal material, such as carbon steel or other types of metal. In the illustrated embodiment shown in FIGS. 1-4, the fitting body may be formed as a suitable stub end for an ASME Class 150 or 300 joint flange.

An internal liner 26 lines an interior surface of the fitting body, including the conduit body 22*a* and the annular flange body 24*a*. In one example, the liner 26 acts as a corrosion-resistance barrier to inhibit liquid in the flanged fitting 12 from contacting and corroding the material (e.g., metal) of the fitting body. In one or more examples, the liner 26 may comprise (e.g., be formed from) a non-metal material, such as glass, graphite, silicon carbide, ceramic, or other non-metal material. In one example, the liner 26 may uniformly cover the entire interior surfaces of the conduit body 22*a* and the annular flange body 24*a*. The liner 26 may have a uniform thickness of up to about 100 mm or other thicknesses. As explained below, the fitting body is modified to ensure the flange joint assembly 10 does not fail when subjected to a fire test temperature between 1400° F.-1800° F. (761° C.-980° C.) for a period of 30 minutes, according to the API Specification 6FB, Titled "Specification for Fire Test for End Connections." That is, the fitting body is suitable for passing the test set forth in API Specification 6FB.

Figure 2:
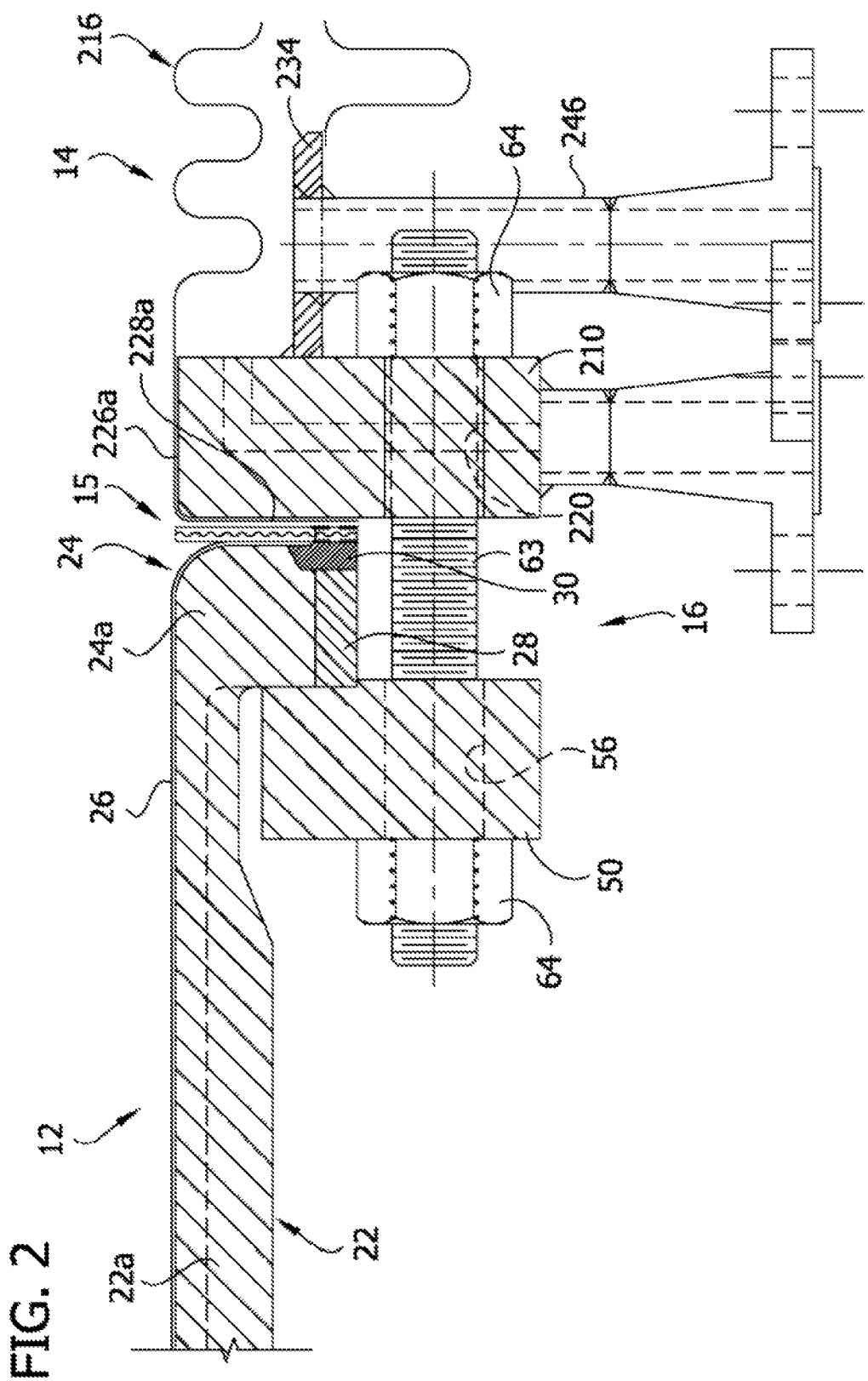
FIG. 2 is an enlarged view as indicated in FIG. 1.
Figure 3:
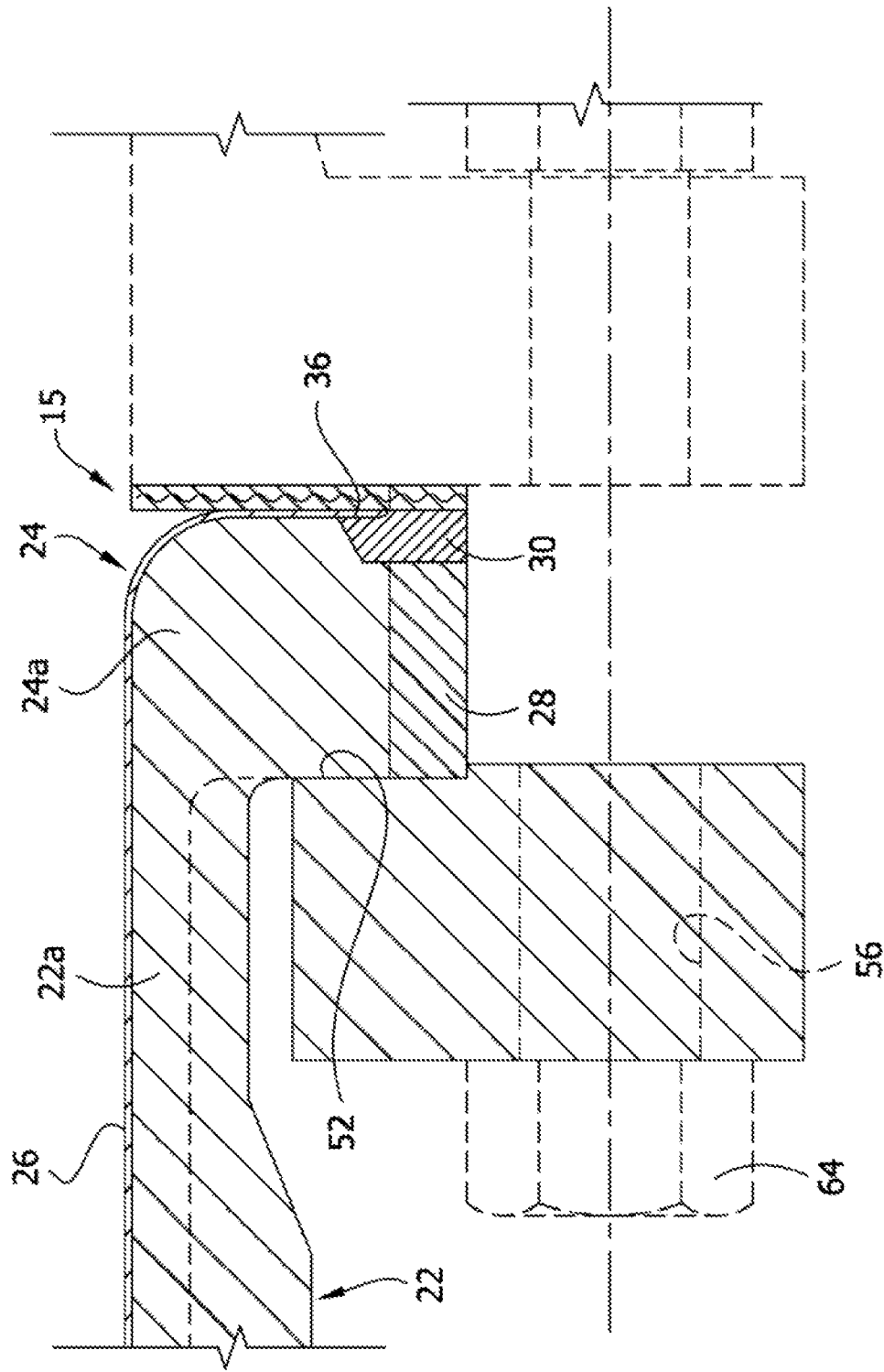
FIG. 3 is an enlarged view similar to FIG. 2, with an expansion joint fitting removed from the flange joint assembly, showing one embodiment of a flanged fitting of the flange joint assembly.
Figure 4:
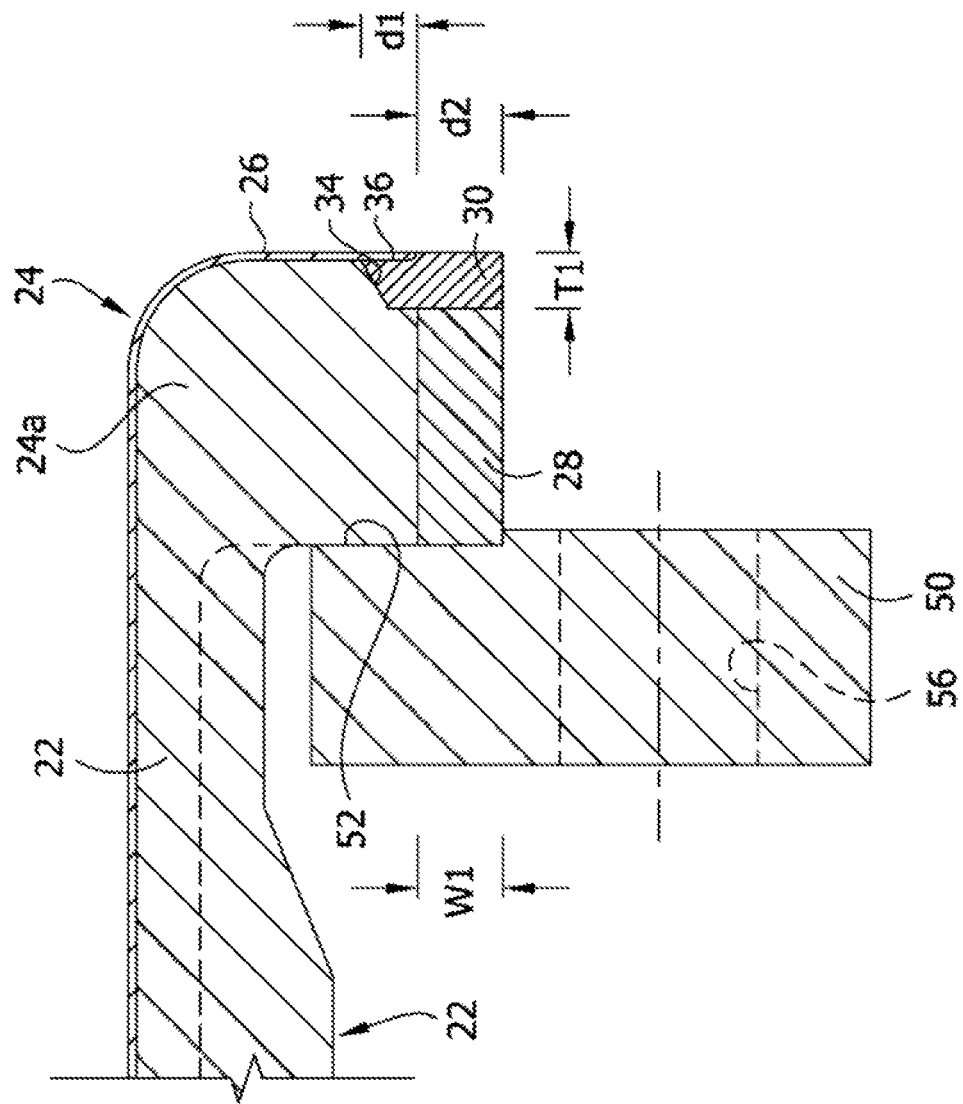
FIG. 4 is similar to FIG. 3, with an annular gasket removed from the flange joint assembly.

For reasons explained below, as shown in FIGS. 2-4, the annular flange 24 of the flanged fitting 12 also comprises an annular flange extension 28 extending around the outer diameter portion of the annular flange body 24*a* and may be formed (e.g., forged and/or machined) as a one-piece, monolithically formed integral part of the annular flange body 24*a*. The annular flange extension 28 increases the diameter of the annular flange 24 of the flanged fitting 12 beyond standard ASME Class 150 or 300 raised face dimensions without interfering with the flanged fitting 12 bolting 63 and fastener openings 56 and 220. The annular flange extension 28 may be fire-rated. For example, the annular flange extension may be comprised of a (e.g., be formed from) a metal material, such as carbon steel or other types of metal that match the annular flange body 24*a*. In one example, as shown in FIG. 4, the annular flange extension 28 may have a radial width W1 of about ⅜" (9.525 mm) to increase the diameter of the annular flange 24 by ¾" (1.905 cm). In other embodiments, the annular flange extension 28 may be formed separately and secured to the flange body 24*a* of an ASME Class 150 or 300 standard raised face configuration flanged fitting by welding or in other suitable ways.

The annular flange 24 of the flanged fitting 12 further comprises an annular insert or inlay 30 adjacent the outer radial end of the annular flange 24. The annular inlay 30 is positioned downstream of the annular flange extension 28 such that a radially outer annular portion of the annular inlay 30 overlies (as viewed from the downstream longitudinal end of the flanged fitting) and abuts the annular flange extension. The annular inlay 30 may have an axial thickness T1 of about ¼" (6.35 mm). Moreover, the radially outer surface of the annular inlay 30 is generally flush with the radially outer surface of the annular flange extension 28. The annular inlay 30 extends radially inward relative to the longitudinal axis LA1 of the flanged fitting 12 and into an annular recess 34 of the annular flange body 24*a* such that a radially outer annular portion of the liner 26 of the annular flange 24 overlies (as viewed from the downstream longitudinal end of the flanged fitting) and abuts a downstream surface of a radially inner annular portion of the annular inlay. In other words, the radially outer annular portion of the liner 26 of the annular flange 24 generally abuts and is positioned downstream of the radially inner annular portion of the annular inlay 30. The annular inlay 30 may be formed and secured from a welding method (i.e. weld overlay—thickness build-up through welding passes with final machining) to the annular flange body 24*a* within the annular recess 34 and forms a one-piece, monolithically formed annular flange body 24a. In one example, as shown in FIG. 4, the annular inlay 30 may extend radially inward from the radially outer end of the liner 26 a distance d1, which may be about ¼" (6.35 mm), to inhibit crevice corrosion that can propagate underneath the liner and lead to cracking and/or failure of the liner. In other embodiments, the annular inlay 30 may be formed separately (e.g., forged and/or machined) and secured to the annular flange body 24a within the annular recess 34 using a welding method or in other suitable ways.

The radially outer annular portion of the annular inlay 30 extends more radially outward than the radially outer annular portion of the liner 26 relative to the longitudinal axis LA1 of the flange fitting 12. For example, as shown in FIG. 4, the annular inlay 30 may extend radially outward from the radially outer end of the liner 26 a distance d2, which may be about ⅜" (9.525 mm). In the illustrated embodiment, the radially inner annular portion of the annular inlay 30 has an annular recess 36 at its downstream longitudinal end surface in which the radially outer annular portion of the liner 26 is received such that the downstream longitudinal end surface of the annular inlay at its radially outer portion is generally flush with the downstream end surface of the liner at the radially outer portion of the liner. Thus, the glass liner 26 lines a radially inner annular portion of the annular downstream end face of the annular fitting flange 24, and a radially outer annular portion of the annular downstream end face of the annular fitting flange is free from the glass liner. Together, the downstream surface of the radially outer portion of the annular inlay 30 and the downstream surface of the liner 26 on the flange 24 define a gasket abutment face at the downstream longitudinal end of the flanged fitting 12. The annular gasket abutment face is generally planar and lies in a plane generally perpendicular to the longitudinal axis LA1 of the flanged fitting 12. The downstream longitudinal surface of the radially outer annular portion of the annular inlay 30 partially defining the gasket abutment face may include a roughened finish, e.g., a phonographic finish (broadly, a serrated surface), to enhance and/or facilitate seating of the annular gasket 15 on the gasket abutment surface. For example, the downstream surface of the radially outer annular portion of the annular inlay 30 may include a phonographic finish of about 125 to about 250 root mean square (RMS) micro inches.

For reasons explained below, the annular inlay 30 may be fire-rated. For example, the annular inlay 30 may comprise (e.g., be formed from) metal, such as a nickel alloy (e.g., Alloy 625, Alloy 600, Alloy C-276/C-22/C-2000, Hastelloy® G-30/G-35/BC-1, Inconel® 686, Monel® 400, Alloy 825, Alloy 200, AL-6XN®, or 904L SS), or a reactive metal (e.g., titanium Gr. 2/Gr. 7, zirconium 702, tantalum, tantalum with 2.5% tungsten), or combinations thereof, including alloys thereof. In one example, the annular inlay 30 is formed from Alloy 625.

In one method of making the flanged fitting 12, a one piece, monolithically formed flanged fitting including the annular flange extension is provided (e.g., forged and/or machined) as the fitting body. The fitting body is machined to form the annular recess 34 in the body. The annular inlay 30 is formed and secured from a welding method (e.g., weld overlay—thickness build-up through welding passes with final machining) to the annular flange body 24a within the annular recess 34 and forms a one-piece, monolithically formed annular flange body 24a. The recess 36 of the inlay 30 is machined. The liner 26 (e.g., glass) is then applied to the interior surface of the flanged fitting body. The flanged fitting 12 may be formed in other suitable ways where the annular flange extension 28 and the annular inlay 30 are formed separately or a combination of monolithically formed parts and separate components and secured using a welding method or in other suitable ways.

Figure 5:
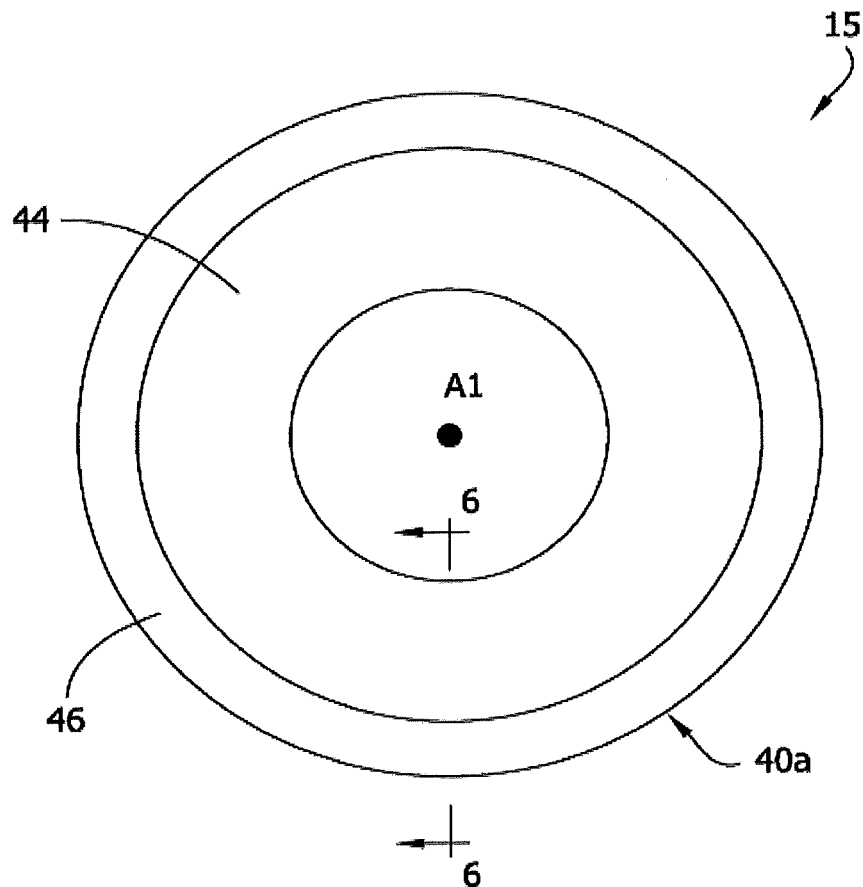
FIG. 5 is an elevational view of the annular gasket.
Figure 6:
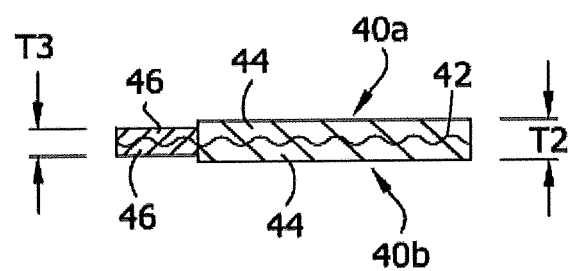
FIG. 6 is a cross section of the annular gasket taken in the plane defined by the line 6-6 in FIG. 5.

Referring to FIGS. 5 and 6, the annular gasket 15 comprises opposing first and second annular gasket layers, generally indicated at 40a, 40b, respectively, (e.g., longitudinally upstream and downstream annular gasket layers), and an inner annular substrate 42 sandwiched between the first and second annular gasket layers. As used herein when describing the annular gasket 15 and its components and structures, an axis A1 of the annular gasket is used as the point of reference for the terms "axially," "radially," "inner," "outer," and like qualifiers. Each annular gasket layer 40a, 40b comprises a radially inner annular gasket segment 44 and a radially outer annular gasket segment 46 secured to a radially outer end of and circumferentially surrounding the radially inner annular gasket segment.

The radially inner annular gasket segment 44 of the upstream annular gasket layer 40a generally opposes, abuts and seats against the liner 26 of the annular flange 24. The radially inner annular gasket segment 44 of the downstream gasket layer 40b is configured to generally oppose, abut and seat against an annular flange or other component of the other component (e.g., the expansion joint fitting 14) of the flange joint assembly 10. The radially inner annular gasket segment 44 is sized and shaped to extend from the radially outer end of the liner 26 on the annular flange 24 toward longitudinal axis of the flanged fitting 12 when the joint flange assembly 10 is assembled. In one example, the radially outer ends of the radially inner annular gasket segments 44 and the radially outer end of the liner 26 of the annular flange 24 are spaced at an equal radial distance from the longitudinal axis LA1 of the flanged fitting 12 such that the two radially outer ends are generally aligned axially. The radially inner annular gasket segment 44 of the upstream annular gasket layer 40a accommodates imperfections in the liner 26, provides a chemical seal, and protects and inhibits breakage of the non-metal liner, which may be glass or other frangible material. The radially inner annular gasket segments 44 of the upstream and downstream annular gasket layers 40a, 40b may comprise (e.g., be formed from) a fluoropolymer, such as polytetrafluoroethylene (PTFE), including expanded PTFE (ePTFE). An example of suitable ePTFE is sold under the trademark GORE-TEX® and manufactured by W. L. Gore & Associates. The radially inner annular gasket segments 44 of the upstream and downstream layers 40a, 40b may comprise (e.g., be formed from) other types of materials, including other types of polymers. Together, the radially inner annular gasket segment 44 of the upstream annular gasket layer 40a and the liner 26 (e.g., glass liner) of the annular flange 24 form a liquid-tight seal.

The radially outer annular gasket segment 46 of the upstream annular gasket layer 40a generally opposes, abuts and seats against the annular inlay 30 of the annular flange 24. The radially outer annular gasket segment 46 of the downstream annular gasket layer 40b is configured to generally oppose, abut and seat against an annular flange or other component of the other component (e.g., the expansion joint fitting 14) of the flange joint assembly 10. The radially outer annular gasket segment 46 is sized and shaped to radially extend from the radially outer end of the annular inlay 30 on the annular flange 24 toward the longitudinal axis LA1 of the flanged fitting 12 when the joint flange assembly 10 is assembled. In one example, the radially outer ends of the radially outer annular gasket segments 46 are generally flush with the radially outer end of the annular inlay 30. The phonographic finish of the downstream surface of the radially outer annular portion of the annular inlay 30 facilitates seating of the radially outer annular gasket segment 46 of the upstream gasket layer 40a on the annular inlay and inhibits movement of the gasket 15 relative to the annular inlay and the flanged fitting 12. The layers 40a, 40b of the radially outer gasket segment 46 provide a fire-rated seal at the outer radial end of the annular flange 24. The radially outer annular gasket segments 46 of the upstream and downstream layers 40a, 40b may comprise (e.g., be formed from) graphite, such as flexible graphite. The radially outer annular gasket segments 46 of the upstream and downstream layers 40a, 40b may be fire-rated. An example of a suitable radially outer annular gasket segment 46 of flexible graphite is sold under the trademark GRAFOIL® gasket and manufactured by GrafTech International. The radially outer annular gasket segments 46 may comprise (e.g., be formed from) other types of materials, including other types of fire-rated materials. Together, the radially outer annular gasket segment 46 of the upstream gasket layer 40a and the annular inlay 30 of the annular flange 24 form a fire-rated seal.

The inner annular substrate 42 of the annular gasket 15 extends along an entire radial width of the gasket from the inner radial end to the outer radial end thereof. The annular substrate is provided for blow-out resistance to inhibit the annular gasket layers 40a, 40b from being unseated radially and/or forced radially out of its position between the annular flange 24 and the second conduit (e.g., the expansion joint fitting). In the illustrated embodiment, the annular substrate 42 is corrugated radially along its radial width to enhance friction between the annular substrate the annular gasket layers 40a, 40b. The annular substrate 42 may be fire-rated. For example, the annular substrate 42 may comprise (e.g., be formed from) metal, such as, a nickel alloy (e.g., Alloy 625, Alloy 600, Alloy C-276/C-22/C-2000, Hastelloy® G-30/G-35/BC-1, Inconel® 686, Monel® 400, Alloy 825, Alloy 200, AL-6XN®, or 904L SS), or a reactive metal (e.g., titanium Gr. 2/Gr. 7, zirconium 702, tantalum, tantalum with 2.5% tungsten), or combinations thereof, including alloys thereof. In one example, the annular substrate 42 is formed from tantalum. The annular substrate 42 may comprise (e.g., be formed from) other types of materials, including other types of fire-rated materials.

In the illustrated embodiment, as shown in FIG. 6, a combined, uncompressed axial thickness T2 of the gasket layers 40a, 40b and the annular substrate 42 at the radially inner annular gasket segment 44 is greater than the combined, uncompressed axial thickness T3 of the layers and the annular substrate 42 at the radially outer annular gasket segment 46. When sandwiched between the flanged fitting 12 and the second flanged conduit (e.g., expansion joint fitting 14), such as shown in FIG. 3, the axial thickness of the gasket 15 may be substantially uniform along the radial width. As such, the gasket layers 40a, 40b at the radially inner annular gasket segment 44 (e.g., ePTFE layers) are compressed more than the gasket layers at the radially outer annular gasket segment 46 (e.g., flexible graphite layers). Such a configuration may be advantageous where the layers 40a, 40b at the radially inner annular gasket segment 44 (e.g., ePTFE layers) need to be compressed more than the gasket layers at the radially outer annular gasket segment 46 (e.g., flexible graphite layers) to provide a suitable seal with the liner 26 at the annular flange 24.

As explained above, the flange coupler assembly 16 is used to couple the flanged fitting 12 and the annular gasket 15 to a second conduit, e.g., the expansion joint fitting 14. In the illustrated embodiment, the flange coupler assembly 16 comprises an annular coupling flange 50 (e.g., a split flange or lap flange) configured to engage a upstream end surface of the annular flange of the flanged fitting 12. As used herein when describing the first annular coupling flange 50 and its components and structures, an axis A2 of the flange coupler assembly is used as the point of reference for the terms "axially," "radially," "inner," "outer," and like qualifiers. A downstream face of the first annular coupling flange 50 defines an annular flange recess 52 at a radially inner portion thereof extending around the axis A2 of the flange coupler assembly 16 in which a portion of the annular flange 24 of the flanged fitting 12, including a portion of the radially outer end thereof, is received. The annular coupling flange 50 defines a plurality of fastener openings 56 spaced apart around the axis A2 of the flange coupler assembly 16 and extending through the upstream and downstream faces of the first annular coupling flange. The fastener openings 56 are axially alignable with fastener openings in an opposing annular coupling flange, for example. (The illustrated opposing annular coupling flange is discussed in more detail below when discussing the expansion joint fitting 14.) The first annular coupling flange 50 may comprise (e.g., be formed from) a metal material, such a carbon steel or other types of metal. The flange coupler assembly 16 suitably facilitates a liquid-tight and fire-rated seal at the gasket 15 interfaces and does not exceed compressive force that would crush the gasket layers 40a, 40b and/or crack the liner 26 (e.g., glass liner).

The gasket 15 ensures the flange joint assembly 10 does not fail when subjected to a fire test temperature between 1400° F.-1800° F. (761° C.-980° C.) for a period of 30 minutes, according to the API Specification 6FB, Titled "Specification for Fire Test for End Connections." That is, the gasket 15 is suitable for passing the test set forth in API Specification 6FB. The radially outer annular gasket segment 46 and the annular inlay 30 form an annular fire-rated seal to inhibit spreading of fire from outside the flange joint assembly 10 to the inside, and from inside the flange joint assembly to outside due to one or more of spalling and/or melting of the liner 26 (e.g., glass liner) and/or melting of the radially inner annular gasket segment 44 (e.g., ePTFE material) of the annular gasket 15. This fire-rated seal is due to each of the radially outer annular gasket segments 46, the annular substrate 42, and the annular inlay 30, which are fire-rated, being radially outward of the radially inner annular gasket segment 44 and the liner 26 (e.g., glass liner), each of which are not formed from material meeting NFPA 30. In one embodiment, where the annular inlay 30 is a nickel alloy (e.g. Alloy 625) or reactive metal, the inlay has high temperature capability to reduce sensitization of the inlay 30 in a glass furnace when applying the glass liner 26, for example, so that corrosion resistance is not reduced. High corrosion resistance may reduce corrosion of the fire-rated seal, such as during maintenance of the flange joint assembly 10. The inlay 30 may be of other materials.

In addition to forming a fire-rated seal, the annular gasket 15 creates a liquid-tight seal at the interface of the liner 26 (e.g., glass liner) and the radially inner annular gasket segment 44 (e.g., ePTFE). Moreover, the annular insert 30 provides blow-out resistance to inhibit the gasket 15 from being displaced from between the flange joint assembly 10 (e.g., unseated) if pressure rises within the flange joint assembly, such as due to an internal fire. In one particular embodiment, the annular insert also maintains the fire rating of the fire-rated seal at the radially outer annular gasket segment 46 and maintains the fire rating of the gasket 15 as a whole. For example, the annular insert 30 may be fire-rated. For example, the annular insert 30 may comprise (e.g., be formed from) metal, such as nickel alloy, reactive metal. In one or more embodiments, the radially outer annular gasket segment 46 also eliminates electrical grounding issues and development of static build-up where each of the layers 40*a*, 40*b* and the annular substrate 42 at the radially outer annular gasket segments 46 are electrically conductive. This arrangement will dissipate any static charge or electrical energy from equipment to the conduit system without the need for electrical jumpers which is a specific requirement in NFPA 30, Section 6.5.4, Titled "Static Electricity."

The flanged fitting 10, including the annular gasket 15, may be coupled to another component (e.g., liquid-conveying component) having a flange design suitable for the joint assembly to pass the test in API Specification 6FB. In addition to the illustrated expansion joint fitting 14, described below, non-limiting examples of flange designs suitable for components to be coupled with the flanged fitting, including the annular gasket 15, include, but are not limited to: 1) flat faced metallic weld-neck or slip-on flange with phonographic finish or spiral serrated surface across the special raised face diameter equal to the diameter of the annular flange 24 of the flanged fitting 10; 2) lap joint flange with metallic stub-end raised face diameter equal to diameter of the annular flange 24 of the flanged fitting 10; 3) metal lined (e.g., tantalum) flange with metal liner raised face diameter equal to diameter of the annular flange 24 of the flanged fitting 10; and 4) glass-lined carbon steel flange similar or identical to the annular flange of the flanged fitting 10. The components for coupling with the flanged fitting 10 may have other flange designs.

Figure 7:
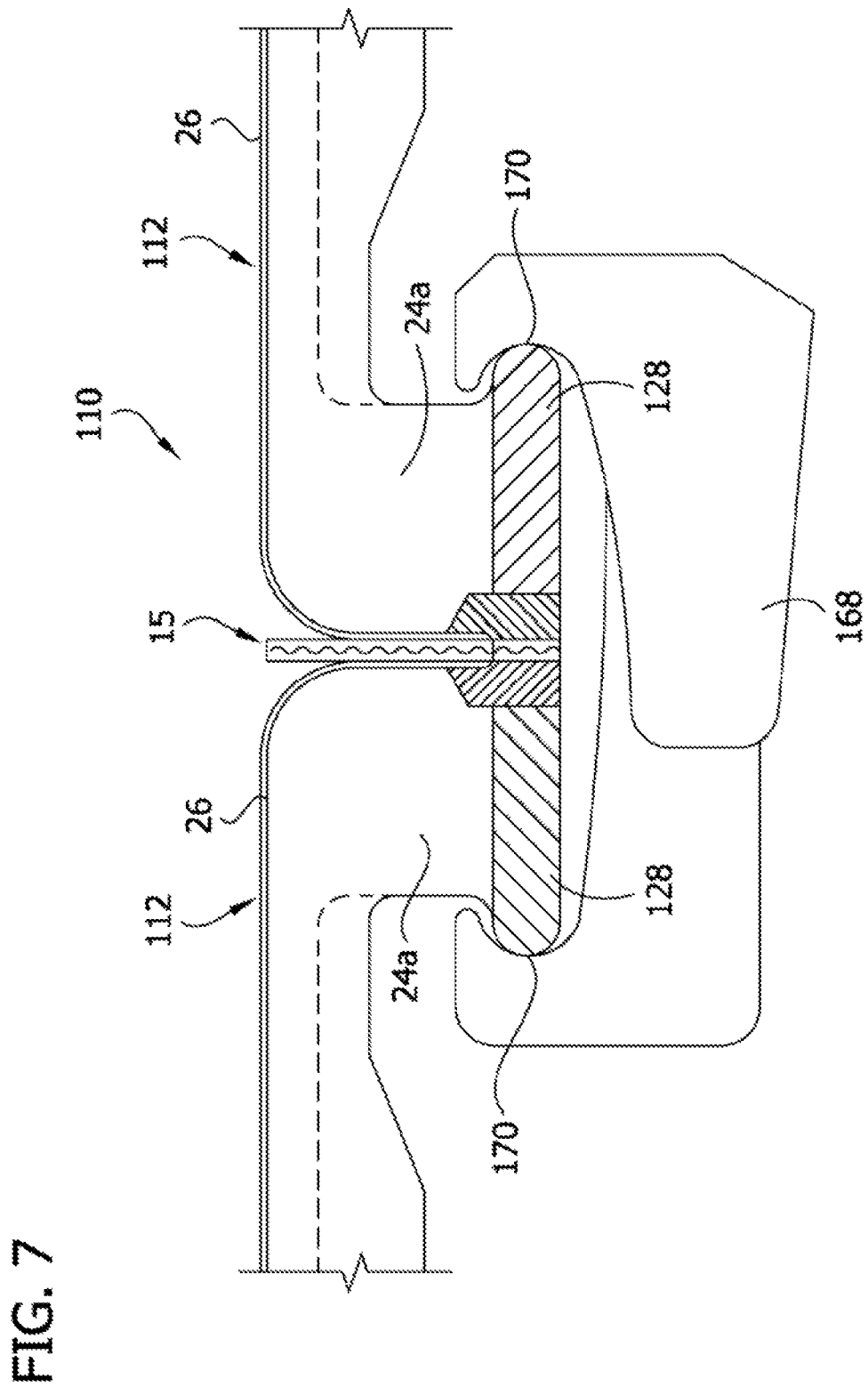
FIG. 7 is an enlarged, partial cross section of another embodiment of a flange joint assembly including two second embodiments of flanged fittings coupled to one another and the annular gasket disposed therebetween.
Figure 8:
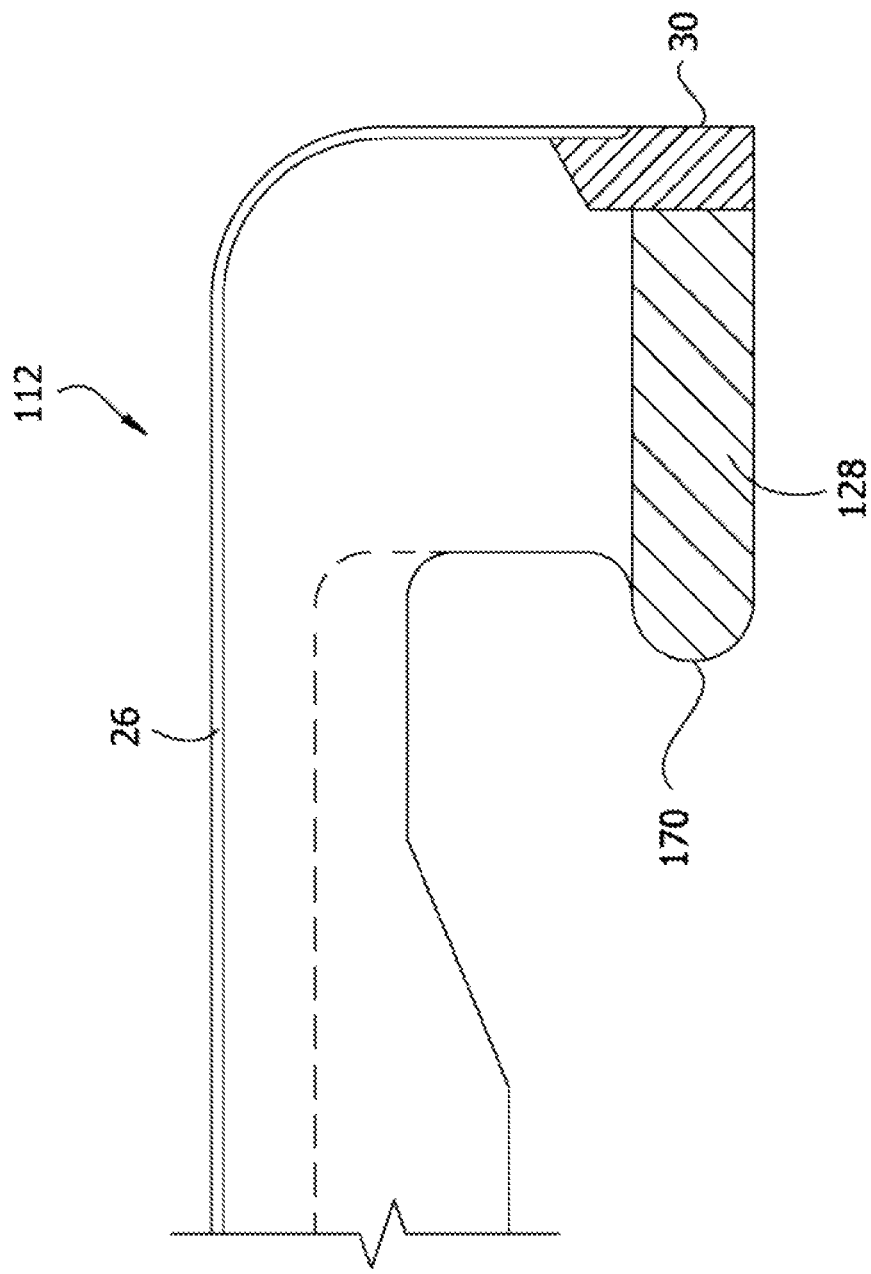
FIG. 8 is an enlarged, partial cross section of one of the flanged fittings in FIG. 7.

Referring to FIG. 7, another embodiment of a flange joint assembly is generally indicated at 110. This flange joint assembly 110 is the similar to the first flange joint assembly 10, with differences between described hereinafter. Identical components are indicated by the same reference numbers.

Unlike the first flange joint assembly 10, the present flange joint assembly 110 includes flanged fittings 112 that are suitable for being coupled together or to other fittings using a flange clamp(s) 168 rather than a coupling flange component, as with the first embodiment. To this end, an annular flange extension 128 of the flanged fitting 112 has a rounded end 170 that project axially from the annular flange body 24*a*. The rounded upstream end 170 accommodates the flange clamp(s). As an example, the flanged fittings 112 may be used as or incorporated on one or more of manways, dome covers, nozzles, nozzle covers, piping, other trim/equipment connections, etc. The flanged fittings 112 may be manufactured in substantially the same way as the first flange fitting 12.

Figure 9:
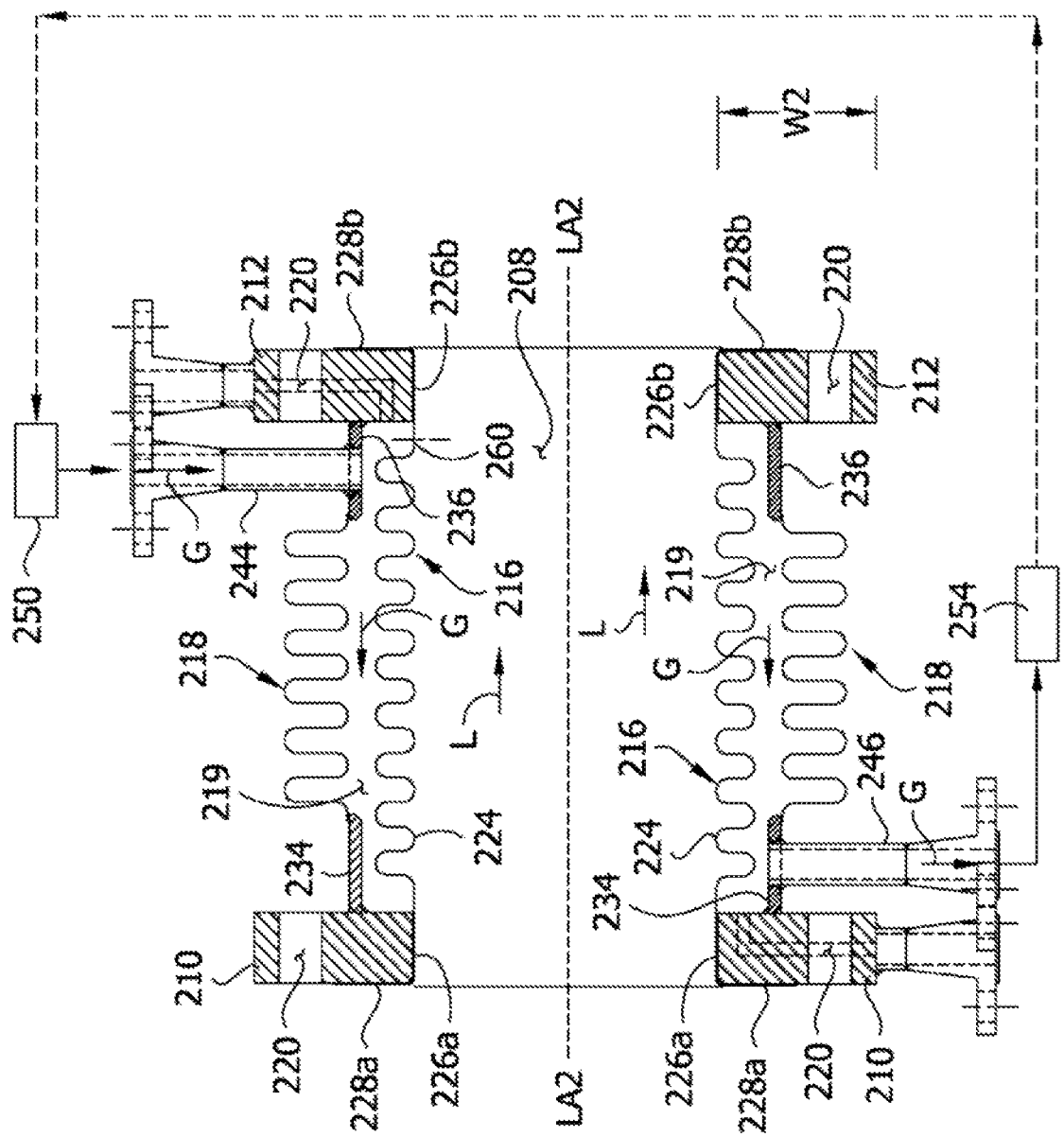
FIG. 9 is a cross section of the expansion joint fitting constructed according to the teachings of the present disclosure.

Referring to FIGS. 1 and 9, the illustrated expansion joint fitting 14 defines a liquid flow passage 208 extending along a longitudinal axis LA2 of the expansion joint fitting. The expansion joint fitting 14 comprises first and second annular coupling flanges 210, 212, respectively, (e.g., upstream and downstream coupling flanges) spaced apart from one another along the longitudinal axis LA2 of the expansion joint fitting; and concentric radially inner and outer bellows, generally indicated at 216, 218, respectively, extending axially between and interconnecting the upstream and downstream coupling flanges. As used herein when describing the expansion joint fitting 14 and its components and structures, the longitudinal axis LA2 of the expansion joint fitting is used as the point of reference for the terms "axially," "radially," "inner," "outer," and like qualifiers. The radially inner and outer bellows 216, 218 are radially spaced apart from one another to define an annular plenum 219 therebetween extending axially along the expansion joint fitting 14.

Each of the upstream and downstream annular coupling flanges 210, 212 defines a plurality of fastener openings 220 spaced apart around the longitudinal axis LA2 of the expansion joint fitting 14 and extending through the upstream and downstream faces of the corresponding annular coupling flange. The fastener openings 220 are axially alignable with fastener openings (e.g., openings 56, FIG. 2) in an opposing annular coupling flange (e.g., coupling flange 50), as shown in FIG. 1, for example. Each of the annular coupling flanges 210, 212 may comprise (e.g., be formed from) a metal material, such a carbon steel or other types of metal. For reasons explained below, in the illustrated embodiment (FIG. 9) a radial width W2 of one or more of the annular coupling flanges 210, 212 may be greater than a radial width of the annular coupling flange 50 of the illustrated flanged fitting 12.

The radially inner bellows 216 includes an annular corrugated body 224 and opposite upstream and downstream longitudinal end portions respectively, secured to the respective upstream and downstream annular coupling flanges 210, 212, respectively. The upstream longitudinal end portion of the radially inner bellows 216 includes an axial segment 226*a* extending along and secured to the interior annular surface of the upstream coupling flange 210, and an annular radial segment 228*a* extending radially outward from the axial segment radially along and secured to a upstream end face of the upstream annular coupling flange 210. The downstream longitudinal end portion of the radially inner bellows 216 includes an axial segment 226*b* extending along and secured to the interior annular surface of the downstream coupling flange 212, and an annular radial segment 228*b* extending radially outward from the axial segment radially along and secured to a downstream end face of the upstream annular coupling flange 210. The annular radial segments 228*a*, 228*b* define respective first and second annular gasket abutment faces of the expansion joint 14.

The radially inner bellows 216 may be fire-dated. The radially inner bellows 216 may comprise (e.g., be formed from), metal such as nickel alloy (e.g., Alloy 625, Alloy 600, Alloy C-276/C-22/C-2000, Hastelloy® G-30/G-35/BC-1, Inconel® 686, Monel® 400, Alloy 825, Alloy 200, AL-6XN®, or 904L SS), or a reactive metal (e.g., titanium Gr. 2/Gr. 7, zirconium 702, tantalum, tantalum with 2.5% tungsten), or combinations thereof, including alloys thereof. In one example, the radially inner bellows 216 is multi-layered. For example, the radially inner bellows 216 may include a radially innermost layer comprising a first type of material (e.g., a reactive metal or nickel alloy), and one or more radially outer layers, each comprising a material different from the innermost layer (e.g., a reactive metal or nickel alloy). In one example, the radially innermost layer of the radially inner bellows 216, which defines the liquid-conveying passage 208 of the expansion joint fitting, may comprise tantalum, or another type of reactive metal. In this same example, the one or more radially outer layers (e.g., two, three, or more layers) may comprise Alloy 625, or another type of nickel alloy. Each of the layers of the radially inner bellows 216 may have a thickness of about 0.5 mm. The respective downstream and upstream longitudinal end portions of the radially inner bellows 216 may be secured to the corresponding annular coupling flanges 210, 212, such as by spot welding, seal welding, or in other ways.

The radially outer bellows 218 includes a corrugated body and is coupled to the upstream and downstream annular coupling flanges 210, 212 by corresponding upstream and downstream annular mounting brackets 234, 236, respectively, mounted on the respective upstream and downstream annular coupling flanges. The upstream annular mounting bracket 234 on the upstream annular coupling flange 210 is disposed radially outward of the radially inner bellows 216 and projects axially (i.e., downstream) toward the downstream annular coupling flange 212. The downstream annular mounting bracket 236 on the downstream annular coupling flange 212 is disposed radially outward of the radially inner bellows 216 and projects axially (i.e., upstream) toward the upstream annular coupling flange 210. The annular mounting brackets 234, 236 may be welded to the corresponding upstream and downstream annular coupling flanges 210, 212, or may be secured thereto in other ways.

The radially outer bellows 218 may be fire-rated and may comprise (e.g., be formed from) metal, such as, but not limited to, nickel alloy (e.g., Alloy 625, Alloy 600, Alloy C-276/C-22/C-2000, Hastelloy® G-30/G-35/BC-1, Inconel® 686, Monel® 400, Alloy 825, Alloy 200, AL-6XN®, or 904L SS), or a reactive metal (e.g., titanium Gr. 2/Gr. 7, zirconium 702, tantalum, tantalum with 2.5% tungsten), or combinations thereof, including alloys thereof. In one example, the radially outer bellows 218 is multi-layered. For example, each of the layers of the radially outer bellows 218 may comprise (e.g., be formed from) nickel alloy, such as Alloy 625, or another type of nickel alloy. Each of the layers of the radially outer bellows 218 may have a thickness of about 0.5 mm. The respective downstream and upstream longitudinal end portions of the radially outer bellows 218 may be secured to the corresponding annular mounting brackets 234, 236, such as by welding or in other ways.

The expansion joint fitting 14 further includes an inlet port 244 and an outlet port 246, each of which is in fluid communication with the annular plenum 219. In the illustrated embodiment, the inlet port 244 is mounted on the downstream annular mounting bracket 236 and extends radially outward therefrom, and the outlet port 246 is mounted on the upstream annular mounting bracket 234 and extending radially outward therefrom. It is understood that the locations of the ports 244, 246 may be reversed in other embodiments. In use, a purge gas (e.g., an inert gas, such as, but not limited to, nitrogen) from a gas source 250 is delivered into the annular plenum 219. The gas source 250 may include a compressor or gas cylinder for pressurizing the gas. The purge gas flows axially (e.g., upstream) through the annular plenum 219 and exits the annular plenum through the outlet port 246. In the illustrated embodiment, the axial flow of purge gas (as indicated by arrows G) through the annular plenum 219 is in an axial direction (e.g., upstream) that is opposite the axial direction (e.g., downstream) of the flow of liquid through the expansion joint fitting 14 (as indicated by arrows labeled L). In other embodiments, the axial flow of purge gas may be in the same direction as the flow of liquid.

In one embodiment, the purged gas that has exited the annular plenum 219 may be analyzed to determine if liquid in the expansion joint fitting 14 is leaking through the radially inner bellows 216, which may indicate failure of the expansion joint fitting. In particular, if liquid or gas (i.e., fluid) is leaking into the annular plenum 219, at least some amount of the liquid or gas will be entrained in the flowing purge gas and carried outside the annular plenum through the outlet port 246. The exited purge gas may be analyzed continuously or periodically to detect any potential failure of the expansion joint fitting 14. For example, the exited purge gas may flow through a detector or analyzer 254 suitable for detecting the flammable liquid or gas or other foreign substances entrained in the purge gas. The purge gas may be in a closed loop system, whereby any foreign substance in the purge gas is filtered via a filter system before being re-delivered into the annular plenum 219.

In one embodiment, one or more leak detection openings 260 are formed in the radially inner bellows 216 adjacent the inlet port 244 when the inner bellows 216 is multi-layered. The leak detection openings 260 penetrate only the outer layers of the inner bellows 216 in this example and fluidly connect the liquid flow passage 208 to the annular plenum 219 so that leak detection can be more expedient due to failure of the inner layer of the inner bellows 216 which can be a different material of construction (MOC) from the outer layers of the inner bellows 216. This will provide a leak detection alert that there is a corrosion or failure issue with the inner layer of the multi-layer inner bellows 216. In one example, one or more leak detection openings may have a diameter of about 3 mm.

In the illustrated embodiment, the expansion joint fitting 14 is coupled to the flanged fitting 12 and the gasket 15 so that the joint assembly 10 is liquid-tight and passes the test set forth in API Specification 6FB. In this example, the annular coupling flange 50 of the flanged fitting 12 is secured to the upstream annular coupling flange 210 of the expansion joint fitting 14 with the fasteners extending through the corresponding aligned fastener openings 56, 220. As coupled, the downstream face of the gasket 15 abuts and seats on an upstream face of the annular radial segment 228*a* of the radially inner bellows 216 to form a liquid-tight and fire-rated seal. In particular, the annular radial segment 228*a* abuts and seats on both the radially outer annular gasket segment 46 to form the fire-rated seal, and the radially inner annular gasket segment 44 to form the liquid-tight seal.

The illustrated expansion joint fitting 14 provides secondary protection should a leak form in the radially inner bellows 216. That is, radially outer bellows 218 provides a secondary barrier so that any liquid or gas (i.e., fluid) leaking into the annular plenum 219 is contained therein to inhibit leaking of the liquid or gas externally of the expansion joint fitting 14. As also set forth above, the expansion joint fitting 14 may facilitate leak detection of liquid or gas leaking into the annular plenum. Liquid or gas in the annular plenum 219 may be entrained in the purge gas flowing through the annular plenum. This liquid or gas may be detected by the detector or analyzer 254 to indicate the possibility of a leak. Moreover, the purge gas may facilitate removal of the leaked liquid or gas from the annular plenum 219 to further inhibit any leaking of liquid or gas outside the expansion joint fitting 14.

Figure 10:
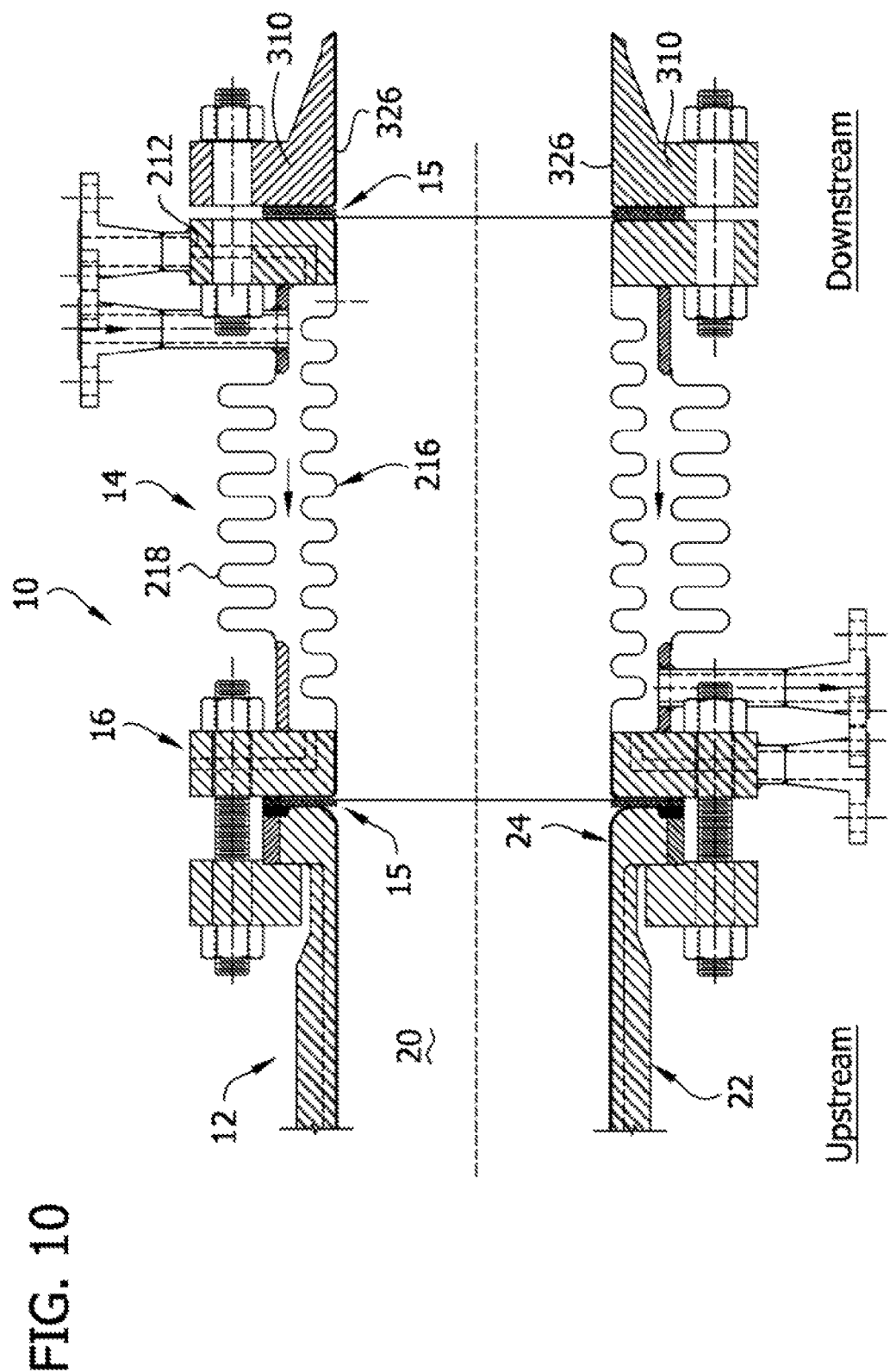
FIG. 10 is similar to FIG. 1 and additionally including a flanged liquid-conveying component attached to a downstream end of the expansion joint fitting.

The expansion joint fitting 14, including the annular gasket 15, may be coupled to another component (e.g., liquid-conveying component) having a flange design so that the joint assembly passes the test in API Specification 6FB. In addition to the illustrated flanged fitting 10, described below, non-limiting examples of flange designs suitable for components to be coupled with the expansion joint fitting 14, including the annular gasket 15, include, but are not limited to: 1) flat faced metallic weld-neck or slip-on flange with phonographic finish or spiral serrated surface across the special raised face diameter equal to one or both of the diameters of the annular radial segments 228*a*, 228*b* of the inner bellows 216 of the expansion joint fitting 14; 2) lap joint flange with metallic stub-end raised face diameter equal to one or both of the diameters of the annular radial segments 228a, 228b of the inner bellows 216 of the expansion joint fitting 14; 3) metal lined (e.g., tantalum) flange with metal liner raised face diameter equal to one or both of the diameters of the annular radial segments 228a, 228b of the inner bellows 216 of the expansion joint fitting 14, such as flange 310 with metal liner 326 (e.g., tantalum) illustrated in FIG. 10; and 4) glass-lined carbon steel flange similar or identical to the annular flange of the flanged fitting 10. The components for coupling with the expansion joint fitting 14 may have other flange designs.

Modifications and variations of the disclosed embodiments are possible without departing from the scope of the invention defined in the appended claims.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. An annular gasket for a flange joint assembly configured to convey flammable fluid and for inhibiting failure of the flange joint assembly when subjected to fire, the annular gasket comprising:
    an annular substrate sandwiched between two annular gasket layers, the annular substrate being of substantially uniform thickness, and corrugated radially with alternating crests and troughs such that a crest on one side aligns with a trough on the opposite side, and each annular gasket layer including:
        a radially inner annular gasket segment comprising a first material, the radially inner annular gasket segment configured to form a liquid-tight seal with an opposing flange, wherein the radially inner annular gasket segment is not fire-rated, and
        a radially outer annular gasket segment surrounding the radially inner annular gasket segment, wherein the radially outer annular gasket segment is fire-rated for forming a fire-rated seal with the opposing flange and wherein the radially outer annular gasket segment is electrically conductive,
    wherein the radial extent of the radially outer annular gasket segment is less than the radial extent of the radially inner annular gasket segment, and
    wherein the annular gasket is configured to inhibit failure of the flange joint assembly when the flange joint assembly is subjected to a fire temperature between 1400° F. and 1800° F., for a period of 30 minutes.

2. The annular gasket set forth in claim 1, wherein the radially inner annular gasket segment comprises a fluoropolymer.

3. The annular gasket set forth in claim 2, wherein the radially inner annular gasket segment comprises expanded polytetrafluoroethylene (ePTFE).

4. The annular gasket set forth in claim 1, wherein the radially outer annular gasket segment comprises graphite.

5. The annular gasket set forth in claim 4, wherein the radially outer annular gasket segment comprises flexible graphite.

6. The annular gasket set forth in claim 5, wherein the radially inner annular gasket segment comprises a fluoropolymer.

7. The annular gasket set forth in claim 1, wherein the radially inner annular gasket segment of each of the annular gasket layers comprises a fluoropolymer, wherein the radially outer annular gasket segment of each of the annular gasket layers comprises graphite, and wherein the annular substrate comprises at least one of nickel alloy, reactive metals, and alloys thereof.

8. An annular gasket for a flange joint assembly configured to convey flammable liquid and for inhibiting failure of the flange joint assembly when subjected to fire, the annular gasket comprising:
    a first annular gasket layer including a first radially inner annular gasket segment and a first radially outer annular gasket segment surrounding the first radially inner annular gasket segment;
    a second annular gasket layer opposing the first annular gasket layer, the second annular gasket layer including a second radially inner annular gasket segment and a second radially outer annular gasket segment surrounding the second radially inner annular gasket segment; and
    a corrugated annular substrate sandwiched between the first annular gasket layer and the second annular gasket layer, the annular substrate being of substantially uniform thickness, and corrugated radially with alternating crests and troughs such that a crest on one side aligns with a trough on the opposite side;
    wherein the first and second radially inner annular gasket segments are configured to form a liquid-tight seal with an opposing flange and are not fire-rated;
    wherein the first and second radially outer annular gasket segments are fire-rated for forming a fire-rated seal with the opposing flange and are electrically conductive;
    wherein the radial extent of the first and second radially outer annular gasket segments is less than the radial extent of the first and second radially inner annular gasket segments;
    wherein the annular gasket is configured to inhibit failure of the flange joint assembly when the flange joint assembly is subjected to a fire temperature between 1400° F. and 1800° F. for a period of 30 minutes; and
    wherein, when the annular gasket is uncompressed, the first annular gasket layer and the second annular gasket layer are cohesively positioned on opposing sides of the corrugated annular substrate to enhance friction between the first annular gasket layer and the second annular gasket layer and the corrugated annular substrate and to provide blow-out resistance, thereby inhibiting the first annular gasket layer and the second annular gasket layer from being unseated radially and/or forced radially out of position.

9. The annular gasket set forth in claim 8, wherein the first and second radially inner annular gasket segments each comprise a fluoropolymer.

10. The annular gasket set forth in claim 9, wherein the first and second radially inner annular gasket segments each comprise expanded polytetrafluoroethylene (ePTFE).

11. The annular gasket set forth in claim 9, wherein the first and second radially outer annular gasket segments each comprise graphite.

12. The annular gasket set forth in claim 11, wherein the first and second radially outer annular gasket segments each comprise flexible graphite.

13. The annular gasket set forth in claim 11, wherein the corrugated annular substrate comprises at least one of nickel alloy, reactive metals, and alloys thereof.

14. The annular gasket set forth in claim 8, wherein, when the annular gasket is uncompressed, a combined axial thickness of the first and second radially inner annular gasket segments and the corrugated annular substrate is greater than a combined axial thickness of the first and second radially outer annular gasket segments and the corrugated annular substrate.

\* \* \* \* \*